US008950129B2

(12) United States Patent
Motosko, II et al.

(10) Patent No.: US 8,950,129 B2
(45) Date of Patent: Feb. 10, 2015

(54) SHUTTER PANEL ASSEMBLY

(71) Applicants: Stephen J. Motosko, II, Sarasota, FL (US); Stephen J. Motosko, III, Sarasota, FL (US); Catherine Motosko, Sarasota, FL (US)

(72) Inventors: Stephen J. Motosko, II, Sarasota, FL (US); Stephen J. Motosko, III, Sarasota, FL (US); Catherine Motosko, Sarasota, FL (US)

(*) Notice: Subject to any disclaimer, the term of this patent is extended or adjusted under 35 U.S.C. 154(b) by 0 days.

(21) Appl. No.: 13/744,184

(22) Filed: Jan. 17, 2013

(65) Prior Publication Data
US 2013/0180188 A1   Jul. 18, 2013

Related U.S. Application Data

(60) Provisional application No. 61/587,411, filed on Jan. 17, 2012.

(51) Int. Cl.
E06B 9/00      (2006.01)
E04B 2/82      (2006.01)
E06B 3/28      (2006.01)
E06B 9/02      (2006.01)
F16B 33/00     (2006.01)
F16B 37/14     (2006.01)
F16B 37/16     (2006.01)

(52) U.S. Cl.
CPC .  E06B 9/02 (2013.01); F16B 33/00 (2013.01); F16B 37/145 (2013.01); F16B 37/16 (2013.01); E06B 2009/005 (2013.01)
USPC ................................. 52/203; 52/127.8; 49/62

(58) Field of Classification Search
CPC ...... E06B 9/02; E06B 2009/005; F16B 33/00

USPC ............... 52/202, 203, 127.8, 506.1, 506.05, 52/745.15; 49/57, 61, 62
See application file for complete search history.

(56) References Cited

U.S. PATENT DOCUMENTS

| 3,356,401 | A  | * | 12/1967 | Bertram | 52/506.05 |
| 5,391,028 | A  | * | 2/1995  | Charles | 411/374 |
| 5,661,935 | A  | * | 9/1997  | Erickson et al. | 52/202 |
| 7,603,820 | B1 | * | 10/2009 | Lai | 52/235 |
| 8,628,049 | B2 | * | 1/2014  | Ghatikar | 248/201 |
| 2007/0107328 | A1 | * | 5/2007  | Munch | 52/202 |
| 2007/0228236 | A1 | * | 10/2007 | MacKay et al. | 248/205.3 |
| 2011/0010997 | A1 | * | 1/2011  | Kislov | 49/141 |

FOREIGN PATENT DOCUMENTS

EP          442810 A1 * 8/1991       E04D 3/36

* cited by examiner

Primary Examiner — Elizabeth A Plummer
(74) Attorney, Agent, or Firm — Gifford, Krass, Sprinkle, Anderson & Citkowski, P.C.

(57) ABSTRACT

A shutter panel assembly is provided to protect a building opening from impact damage. The building opening includes a frame with a bore formed therein and an externally threaded elongated anchor having an exposed portion extending outwardly from a bottom surface of the bore. The shutter panel assembly includes a shutter panel and a fastener. The shutter panel having a first surface, an opposite second surface, and an aperture extend between the first surface and the second surface. The fastener having a shank portion and a flange portion. The shank portion having an internally threaded hollow portion adjacent a distal open end of the shank portion. The flange portion extending radially outwardly from a proximate end of the shank portion.

17 Claims, 8 Drawing Sheets

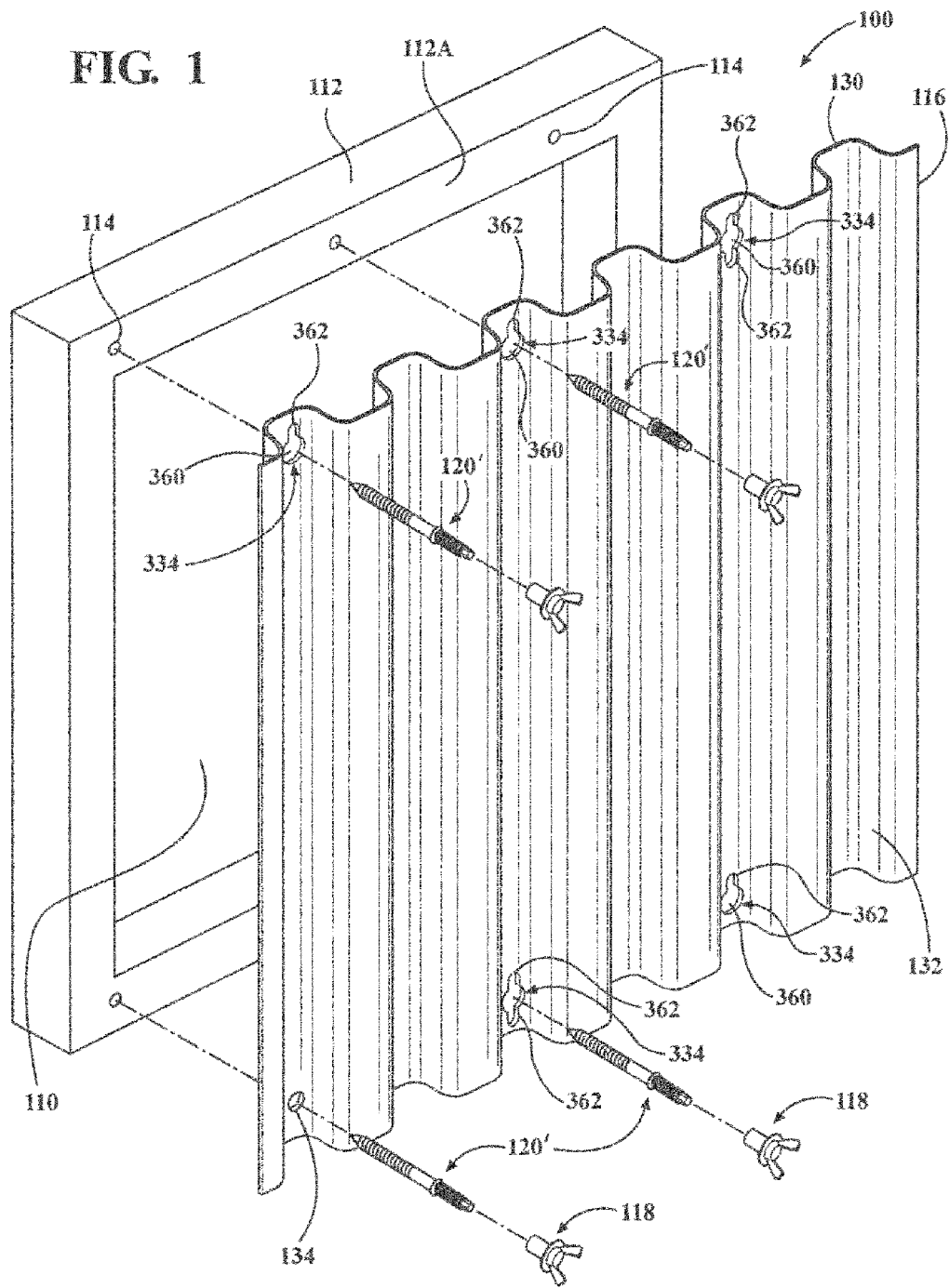

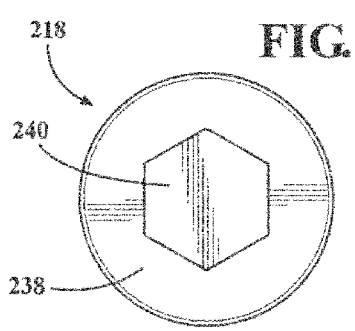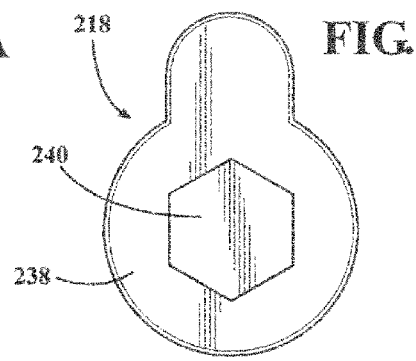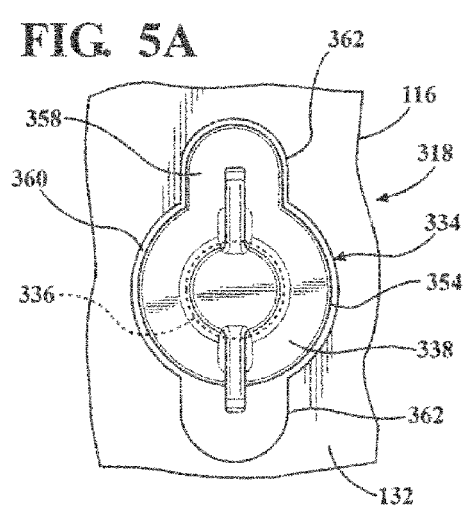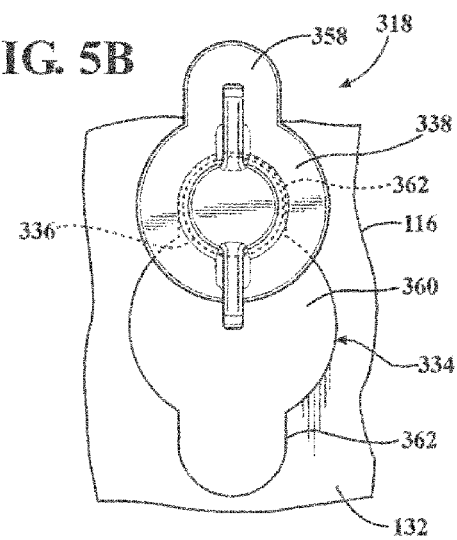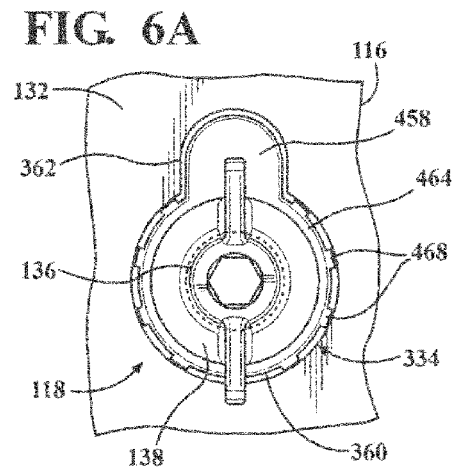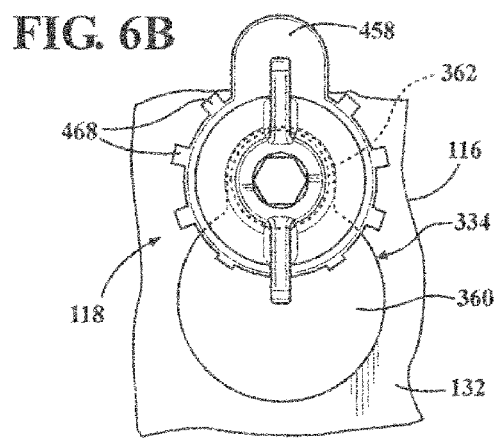

US 8,950,129 B2

SHUTTER PANEL ASSEMBLY

CROSS-REFERENCE TO RELATED APPLICATIONS

This application claims priority of U.S. Provisional Patent Application Ser. No. 61/587,411 filed Jan. 17,2012, which is incorporated herein by reference.

FIELD OF THE INVENTION

The present invention relates to an anchoring system for a shutter panel assembly, more particularly to an anchoring a shutter panel to a building frame with an externally threaded anchor and an internally threaded fastener.

BACKGROUND OF THE INVENTION

Shutter panel assemblies for protecting a building opening from flying impact damage due to hurricanes or the like are provided with an anchoring system in which an elongated anchor is secured to the frame of the building and a fastener attaches to the anchor to secure the shutter panel to the frame. With reference to FIG. 8, a shutter panel assembly is generally illustrated at 10. The shutter panel assembly 10 includes a corrugated shutter panel 16 having a plurality of convex and concave portions. The shutter panel 16 is attached to the frame 12 of the building surrounding the building opening (not shown). A wing nut 18 and an anchor 120 are used to secure the flattened concave portion of the shutter panel 16 to the building frame 12.

FIGS. 9A and 9B illustrate elongated anchors 120 and 120', respectively. The elongated anchors 120 and 120' are commonly sold under the trademark PanelMate® male anchors. The anchor 20 includes an insertion section 122, an attachment section 126 and a drive section 128. The insertion section 122 has large external threads for driving and securing to various building materials. The attachment section 126 has fine machined external threads and the drive section 128 allows for the driving of the anchor 120. FIG. 9B includes an anchor 120' having a radial extending flange 124' positioned between the insertion section 122' and the attachment section 126', and a drive section 128'.

In order to anchor the shutter panel to the building frame 12, the anchor 120 is driven into the building frame 12 through the use of an optional predrilled hole. The anchor 120 extends into the building frame 12 such that the attachment section 126 extends outwardly form a surface of the building frame 12. The shutter panel 16 includes an aperture through which anchor 120 extends. The wing nut 18 has a hollow internally threaded interior which extends from one end through the other end engages with the exposed portion of the anchor 120 extending outwardly from the surface of the building frame. The engagement of the anchor 120 and the wing nut 18 compresses the shutter panel 16 against the building frame 12 in order to support the shutter panel 16.

A particular disadvantage of this commonly known anchoring system is the shear stress that is applied to the exposed portion of the anchor 120. Specifically, the weight and any impact force acting on the shutter panel 16 are supported only by the anchor 120 resulting in an increase in probability of the anchor 120 failing due to the shear force. Specifically, the shear stress is applied directly to the anchor 120 at the point between the surface of the building frame 12 and the interior surface of the shutter panel 16. As such, the diameter, and consequently the cost, of the individual anchor 120 are increased to meet any regulated shear standards.

In addition, the previously known assemblies are time consuming to install as each anchor 120 must be driven into the building frame 14 prior to the installation of the shutter panel 16. Moreover, as the attachment section 16 of the anchors 120 extends outwardly from the surface of the building frame, it is often required to remove the anchors 120 upon uninstalling the shutter panel 16 to provide an aesthetically pleasing appearance. If the anchors 120 are not removed, an unfinished appearance is provided as a plurality of exposed anchors 120 extend from the surface of the building frame 12.

Thus, there exists a need in the art for an improved shutter panel assembly having an anchoring system in which the shear stress on the anchor is reduced and which provides an aesthetically pleasing appearance when the shutter panel is removed while still providing a reduction in installation time.

SUMMARY OF THE INVENTION

The present invention provides an improved shutter panel assembly which overcomes the above mentioned disadvantage of the previously known shutter panel assemblies.

In brief, a shutter panel assembly is provided to protect a building opening from impact damage. The building opening includes a frame with a bore formed therein and an externally threaded elongated anchor having an exposed portion extending outwardly from a bottom surface of the bore. The shutter panel assembly includes a shutter panel and a fastener.

The shutter panel has a first surface, an opposite second surface, and an aperture that extends between the first surface and the second surface. The fastener has a shank portion and a flange portion. The shank portion has an internally threaded hollow portion adjacent a distal open end of the shank portion. The flange portion extends radially outwardly from a proximate end of the shank portion.

The shutter panel is positioned with the first surface abutting the frame and the aperture corresponding with the bore. The shank portion extends through the aperture of the shutter panel and the hollow portion engages the anchor to compress the shutter panel between the frame and the flange portion of the fastener to support said shutter panel against the frame.

A particular advantage of the inventive shutter panel assembly is the placement of the anchor within a bore formed in the surface of the frame surrounding the building opening. As the fastener includes an internally threaded hollow portion, having a distal open end, which receives the anchor, the shear strength of the attachment is increased. Specifically, as the anchor is received within the internally threaded hollow portion of the shank portion of the fastener, the shear stress is applied to the thicker shank portion of the fastener rather than solely on the anchor itself. Further, the increased diameter of the fastener as compared to the anchor provides additional shear strength without increasing the diameter of the anchors and thereby reducing costs.

BRIEF DESCRIPTION OF THE DRAWINGS

A better understanding of the present invention will he had upon reference to the following detailed description when read in conjunction with the accompany drawings, wherein like reference characters refer to like parts throughout the several views and in which:

FIG. 1 is an exploded perspective view of the inventive shutter panel assembly anchored to a frame surrounding a building opening;

FIG. 4A is a top plan view of an alternative fastener configuration;

FIG. 4B is a top plan view of a further alternative fastener configuration;

FIG. 5A is a top view of the engagement of the fastener within the aperture formed in the shutter panel;

FIG. 5B is a top view of the engagement of the fastener within the second portion of the aperture formed in the shutter panel;

FIG. 6A is a top view of the engagement of an alternative fastener within the aperture formed in the shutter panel and a perspective view of the alternative fastener;

FIG. 6B is a top view of the engagement of the alternative fastener within the second portion of the aperture formed in the shutter panel;

DETAILED DESCRIPTION OF THE INVENTION

The present invention has utility as a shutter panel assembly that provides an increase in the shear strength of the attachment of a shutter panel to a frame surrounding a building opening. By providing a fastener having an internally threaded hollow portion that engages and receives the externally threaded exposed portion of an anchor within a bore formed in the surface of the building frame, the shear stress is applied to the fastener rather than directing the entire shear stress on the anchor. As such, the overall shear strength of the attachment is increased without increasing the diameter of the anchors.

With reference to FIG. 1, a shutter panel assembly is generally illustrated at 100. The shutter panel assembly 100 is provided to protect a building opening 110 from impact damage. Typically, the building opening 110 is a window or door of a building; however, the building opening is not limited to such openings. A frame 112 is provided around the building opening 110. The frame 112 includes a frame surface 112A having a plurality of bores 114 formed therein.

Figure 9A:
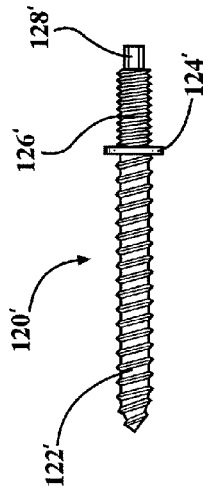
FIG. 9A is a side view illustrating an elongated anchor.
Figure 9B:
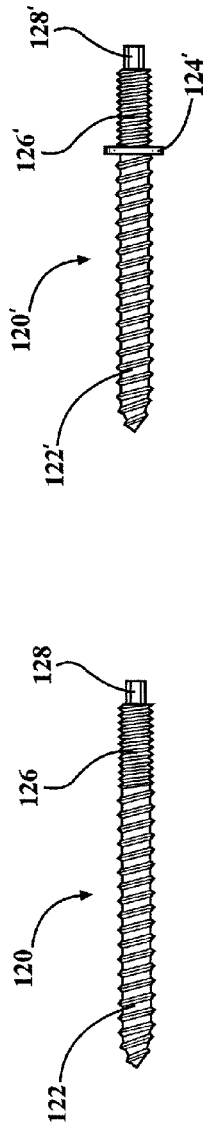
FIG. 9B is a side view illustrating an alternative elongated anchor.

The shutter panel assembly 100 includes a shutter panel 116 and an anchoring system including a fastener 118 and an elongated anchor 120. The elongated anchor 120 is commonly sold under the trademark PanelMate® male anchors. As seen in FIG. 9A the anchor 120 includes an externally threaded insertion section 122 and an externally threaded attachment section 126. The insertion section 122 has large external threads for driving into the building frame 114. The attachment section 126 has fine machined external threads and a drive section 128 allows for the driving of the anchor 120. FIG. 9B depicts an alternative configuration of the anchor 120' having a flange 124' that is disposed between the insertion section 122' and the attachment section 126'. The flange 124' acts as a stopper to prevent inserting the anchor 120' beyond a predetermined depth, as the flange 124' abuts the bottom surface 114A of the bore 114.

In the illustrated embodiment, the drive section 128 is formed having a regular hexagon head for engagement with a correspondingly shaped driver. It is appreciated, of course, that drive section 128 is not limited to the illustrated shape, as the driver section 128 includes other standard and non-standard head shapes illustratively including square, star and indentations includes flat and cross (i.e. Philip).

The shutter panel 116 Includes an interior surface 130 that faces the building opening 110 and an opposite exterior surface 132. A plurality of apertures 134 are formed in the shutter panel 116 and extend between the interior surface 130 and the exterior surface 132. The apertures 134 are provided on the shutter panel 116 so as to correspond to the position of the bores 114 formed in the building frame 114.

Figure 2A:
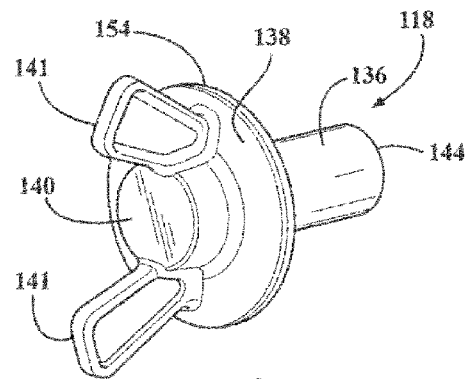
FIG. 2A is a front perspective view of the fastener.
Figure 2B:
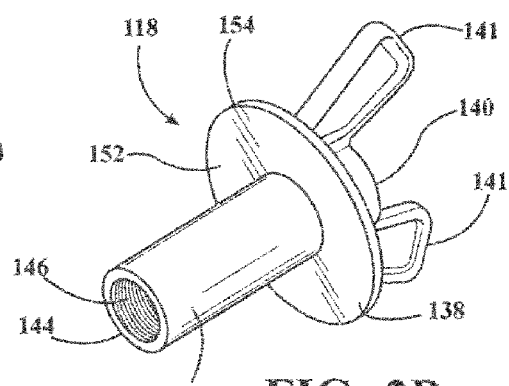
FIG. 2B is a rear perspective view of the fastener.

With reference to FIGS. 2A-2D, the fastener 118 will be described in greater detail. The fastener 118 is formed of a cylindrically shaped shank portion 136, a flange portion 138, and an attachment portion 140. As best seen in FIG. 2D, the shank portion 136 includes a hollow portion 142, having a distal open end 144 and an opposite proximate end 143. The hollow portion 142 includes internal threads 146 which are formed so as to correspond with the external threads of the attachment section 126 of the anchor. The hollow portion 142 further includes a cavity 148 which is absent of the internal threads 146.

The shank portion 136 further includes a solid portion 150 positioned between the hollow portion 142 and the proximate end 143 of the shank portion 142. Specifically, the solid portion 150 is positioned between the cavity 148 of the hollow portion 142 and the proximate end 143 of the shank portion. The flange portion 138 extends radially outwardly from proximate end 143 of the shank portion 142. The flange portion includes an inner surface 152 and a peripheral outer edge 154.

The attachment portion 140 includes a pair of wing tips 141. The wing tips 141 allows a user to tighten the fastener 118 without the use of specific tool or to provide a mechanical advantage.

Figure 2C:
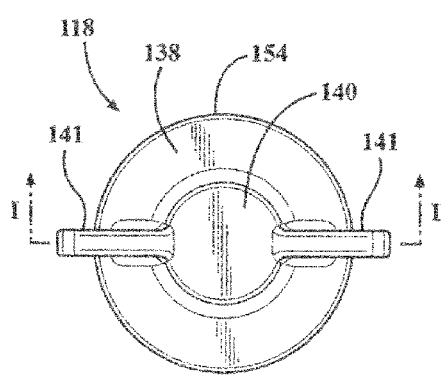
FIG. 2C is a top view of the fastener.
Figure 3A:
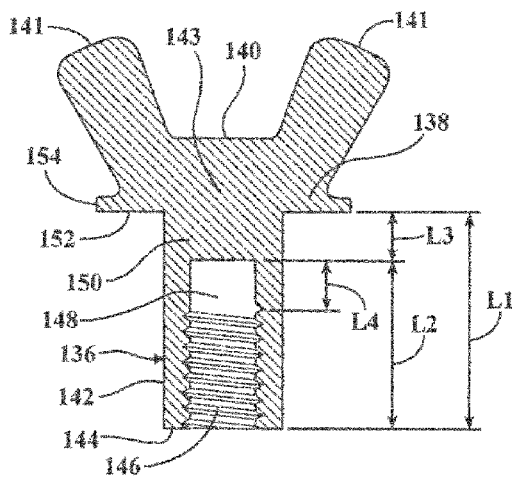
FIG. 3A is a partial cross sectional view taken along the line I-I.

As best seen in FIG. 3A, which is a cross-sectional view taken along the line I-I of FIG. 2C, the shank portion 136 has an overall length L1 from the distal open end 144 to the proximate end 143, i.e. the inner surface 152 of the flange portion 138. The hollow portion 142 has a length of L2 which is less than the length L1. The difference between the length L1 of the shank portion 136 and the length L2 of the hollow portion 142 is equal to the length L3 of the solid portion 150. The cavity 148 as a length L4 that is at least equal to the length of the drive section 128 of the anchor 120.

Figure 7A:
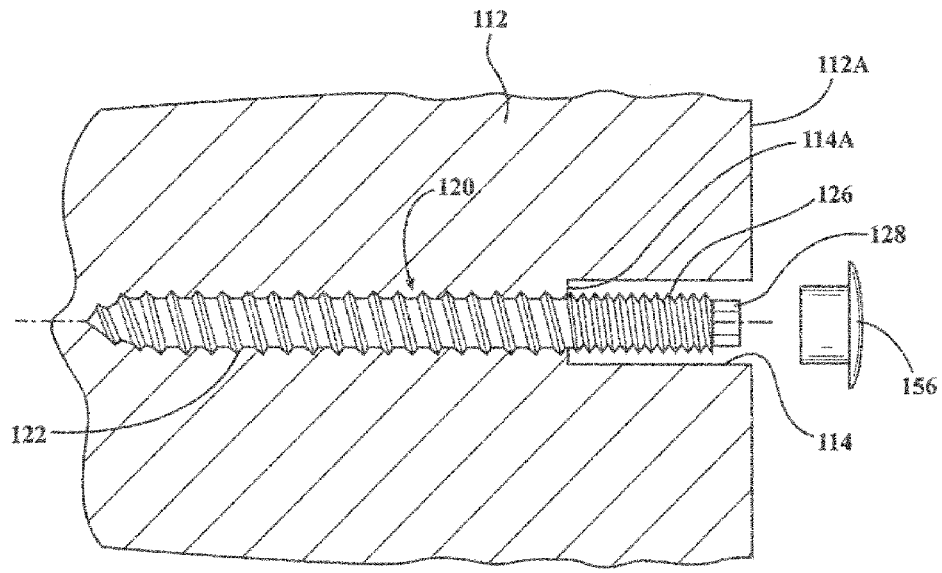
FIG. 7A is a cross-sectional view of the building frame with the predrilled bores.

The anchoring of the shutter panel 116 to the frame 114 will now be described with reference to FIGS. 7A-7B. Prior to anchoring shutter panel 116, a plurality of bores 114 are formed in the surface 112A of the building frame 112. The bore 114 has a diameter that is slightly larger than a diameter of the shank portion 136 of the fastener 118. The bore 114 includes a bottom surface 114A having a length that is generally equal to the length L2 of the hollow portion 142. The insertion section 122 of the anchor 120 is driving into the bottom surface 114A of the bore 114, such that the external threads of the attachment section 126 extends outwardly from the bottom surface 114A of the bore 114. As best seen in FIG. 7A the anchor 120 is driven into the bottom surface 114A of the bore 114 such that the drive section 128 extends substantially flush with the surface 112A of the building frame 112. Specifically, the anchor 120 does not extend beyond the surface 112A of the building frame 112.

After the anchors 120 have been driven into the bottom surface 114A of the bore 114, the apertures 134 formed on the shutter panel 116 are aligned with the bores 114. The fastener 118, specifically, the shank portion 136 is then inserted through aperture 134. which has a diameter slightly larger than the diameter of the shank portion 136, and distal open end 144 receives the drive section 128 of the anchor 120. Upon further insertion and rotation of the fastener 118, the external threads of the attachment section 126 engage with the internal threads 146 formed in the hollow portion 142 and the shutter panel 116 is compressed between the inner surface 152 of the flange portion 138 of the fastener 118 and the surface 112A of the building frame 112. Specifically, the inner surface 152 of the flange portion 138 contacts the exterior surface 132 of the shutter panel 116 and interior surface 130 of the shutter panel 116 contacts the surface 112A of the building frame 112. The compression of the shutter panel 116 secures the shutter panel 116 to the building frame 112.

Figure 7B:
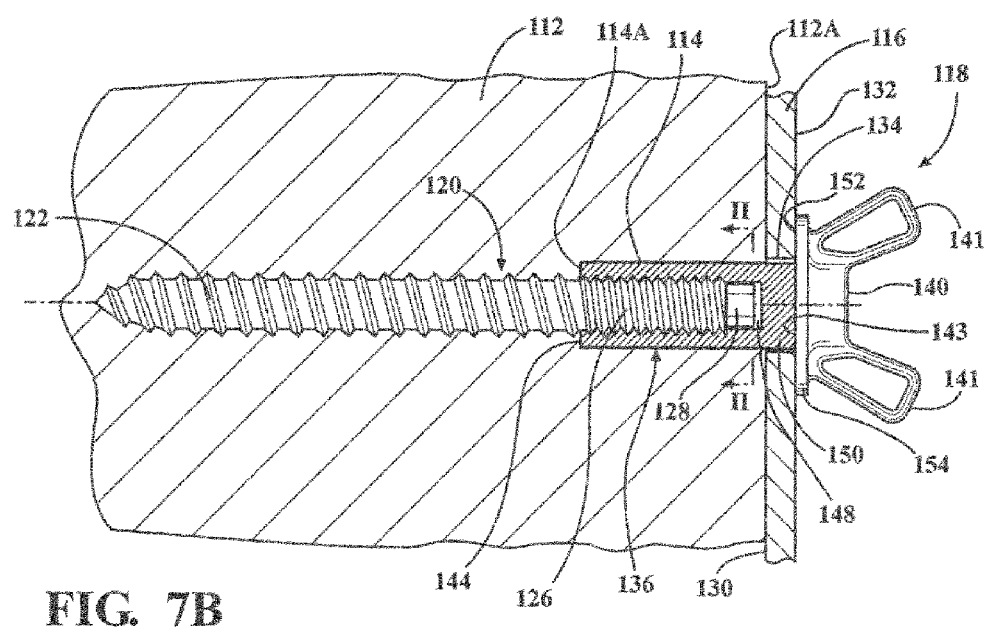
FIG. 7B is a cross-sectional view of the inventive shutter panel assembly anchoring the shutter panel to the building frame.
Figure 7C:
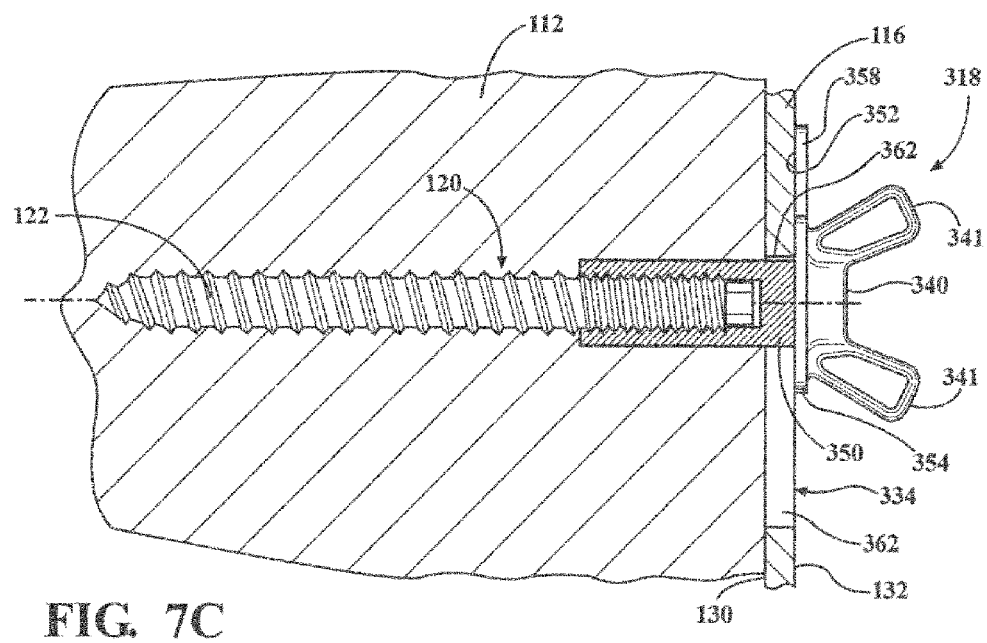
FIG. 7C is a cross-sectional view of the alternative shutter panel anchored to the building frame.

As best seen in FIG. 7B, upon complete engagement of the fastener 118, the distal open end 144 contacts the bottom surface 114A of the bore 114. As the bore 114 has a predetermined depth generally equal to the length L2 of the hollow portion 142, the driver section 128 is received within the cavity 148 when the distal open end 144 abuts the bottom surface 114B of the bore. As the drive section 128 extends substantially flush with the surface 112A of the building frame 112, the solid portion 150 is positioned within the aperture 134 upon insertion of the fastener 118.

Further, the length L3 of the solid portion is provided so as to be generally equal to the thickness of the shutter panel 116. By aligning the solid portion 150 of the shank portion 138 with the aperture 134, the increased diameter of the solid portion 150, as compared to the diameter of the anchor 120, along with the solid construction of the solid portion 150 provides an increase in the shear and pull-out strengths of the shutter panel assembly 100 attachment allowing a more secure and robust attachment of the shutter panel assembly 100 to the building frame 114.

Figure 3B:
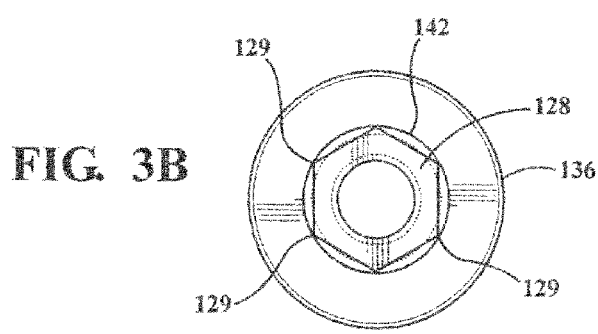
FIG. 3B is a partial cross sectional view taken along the line II-II.

As seen in FIG. 3B, which is cross sectional view taken along the line II-II of FIG. 7B, the cavity portion 148 has a hollow cylindrical configuration with a diameter such that upon engagement of the anchor 120, specifically the attachment section 126, the hexagonal drive section 128 enters the cavity 148 and the corners 129 of the hexagonal drive section 128 contact the interior of the cavity 148.

Moreover, as the anchor 120 does not protrude from the building frame 112, a more pleasing aesthetic appearance of the building frame 114 can he provided through the use of the plugs 156 which are inserted into the building frame 112 covering the opening of the bores 114 without requiring the removal of the anchors 120. As such, the shutter panel assembly 100 can be easily and quickly installed, as the user is only required to remove the plugs 156, align the apertures 134 of the shutter panel 116 and insert and tighten the fasteners 118 to install the shutter panel assembly 110.

With reference to FIGS. 5A and 5B, an alternative fastener is generally illustrated at 318. The fastener 318 is similar to the fastener 118, except the fastener 318 includes a tab portion 358 that extends from the edge 354 of the flange portion 318. With reference to FIGS. 5A and 5B, the shutter panel 116 Is formed with the aperture 334 having a first portion 360 and at least one second portion 362 in communication with the first portion 360. The first portion 360 and the second portion 362 provide the aperture 334 with a keyed slot shape. The first portion 360 has a generally circular shape having a diameter corresponding to the diameter of the flange portion 338. The second portion 362 has a generally semicircular shape having a radius of curvature corresponding to the radius of the shank portion 336 of the fastener 318. Specifically, the second portion 362 has a semicircular shape that includes a pair of generally parallel sides that extend between the ends of the semicircle and the first portion 360.

The keyed slot shape of the aperture 334 provides a particular advantage during installation of the shutter panel 116. During assembly, the fastener 318 is secured to the anchor 120 prior to the attachment of the shutter panel 116. As seen in FIG. 5A, the aperture 334 of the shutter panel 116 is aligned with the previously attached fastener 318, specifically, the first portion 360 is aligned with the flange portion 338 and the tab portion 358 is aligned with the second portion 362. As the first portion 360 has a diameter that corresponds to the diameter of the flange portion 338, the shutter panel 116 passes over the flange portion 338 of the fastener 318 such that the interior surface 130 of the shutter panel contacts the surface 112A of the building frame 112.

The shutter panel 116 can then be positioned vertically to have the second portion 362 receive the shank portion 336 as seen in FIGS. 5B and 7B. As the second portion 362 has a radius of curvature that corresponds to the radius of the shank portion 336, the shank portion 336 is snuggly received within the second portion 362. As the tab portion 358 extends outwardly from the edge 354 of the flange portion 338, the tab portion 358 provides an increase in the contact area between the inner surface 352 of the tab portion 358 (i.e. the flange portion 338) and the exterior surface 132 of the shutter panel 116. The increase in contact area provides additional securement of the shutter panel 116 to the building frame 112 by the engagement of the anchor 120 and the fastener 318. Specifically, the tab portion 358 increases the area of the exterior surface 132 of the shutter panel 116 that is compressed by fastener 318.

As seen in FIG. 1, the shutter panel 116 is optionally provided with apertures 334 having a single second portion 362 or a pair of opposed second portions 362. By providing the shutter panel 116 with a pair of opposed second portions 362 avoids the occurrence requiring the user to reorient the shutter panel 116 if the shutter panel 116 is inadvertently oriented upside down. Specifically, if the aperture 334 only includes a single second portion 362 and the user orients the shutter panel 116 such that the second portion 362 is directed in a downward direction, the user would be required to lift the entire shutter panel 116 in an upward direction in order to have the shank portion 336 enter the second portion 362 and continue to lift the shutter panel 116 until enough of the plurality of fasteners 318 have been tightened to support the weight of the shutter panel 116. However, if the aperture 334 includes a pair of opposed second portions 362, the user would only he required to allow the shutter panel to descend in the downward direction once the shutter panel 116 has been positioned between the previously installed fasteners 318 and the building frame 112. Once the shank portion 336 of the fastener 318 has been received within the second portion 362 all that is required of the user to complete the installation process is to tighten the fasteners 318. It is appreciated, of course, that the apertures 334 having the first portion 360 and at least one second portion 362 are configured for use with the fasteners 118 without a tab portion, as seen in FIG. 1.

Figure 6C:
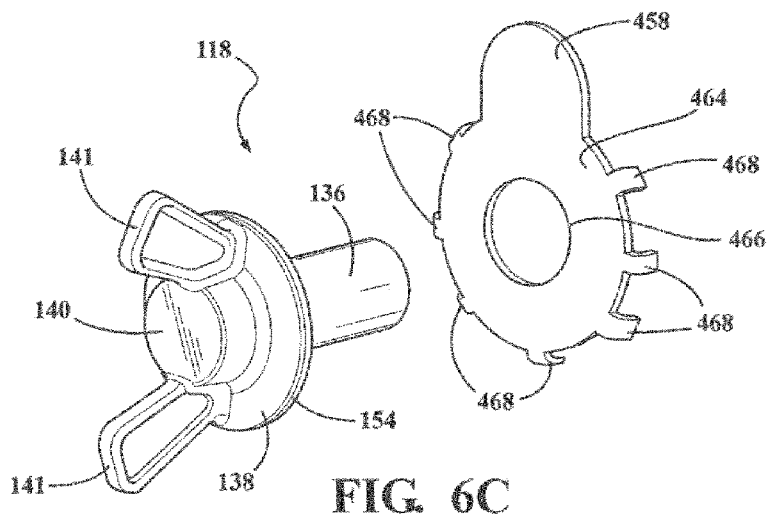
FIG. 6C is a perspective view of the alternative fastener.

With reference to FIGS. 6A-6C, an alternative configuration is illustrated. FIG. 6C depicts the fastener 118 engaged with a washer 464. The washer 464 includes a through hole 466 that has a diameter that corresponds to the diameter of the shank portion 136. The washer 464 has a generally circular shape having a diameter that corresponds to the diameter of the first portion 360 of the aperture. The washer further includes tab portion 458 having a radius that corresponds to the radius of curvature of the second portion 362 of the aperture 334. The washer 464 is optionally a crimped-type washer having a plurality of crimps 468 extending from an exterior edge of the washer 464. Prior to installation, the plurality of crimps 468 extend generally normal to the washer 464. The washer 464 is dimensioned such that the crimps 468 can be received through the first portion 360.

During installation, the shank portion 136 is inserted through the through hole 466 formed in the washer 464, and then fastener 118 is attached to the anchor 120. Once the fastener 118 has been attached to the anchor 120, the apertures 334 formed in the shutter panel 116 are aligned with the fasteners 118 and the washers 464 such that the washer 464 including the crimps 468 extend through the first section 360 and the tab portion 458 extends through the second section 362. During the final tightening of the fastener 118, the crimps 468 plastically deformed due to the contact with the exterior surface 132 of the shutter panel 116 and spread out radially to increase not only the contact area but also the friction between the washer 464 and the shutter panel 116. The tab portion 458 of the washer provides an increase in the compressive area between the flange portion 138 and the shutter panel 116 in a similar manner as the tab portion 358 as the tab portion 458 of the washer 464 increases the contact area between washer 464 and the exterior surface 132 of tire shutter panel.

Figure 7D:
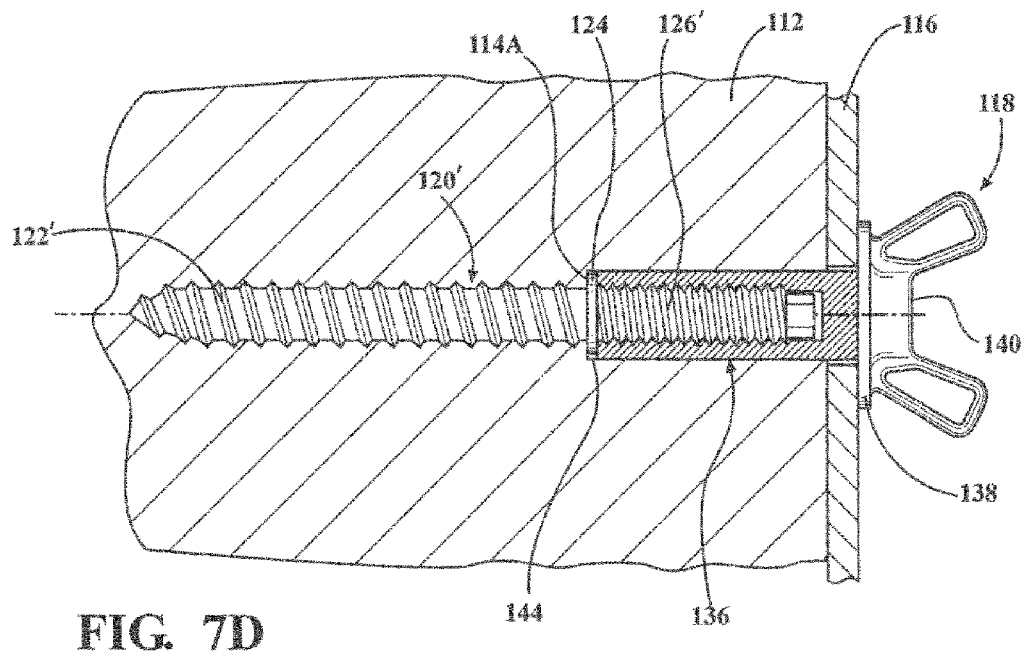
FIG. 7D is a cross-sectional view of the alternative anchor anchoring the shutter panel to the building frame.

With reference to FIG. 7D the fastener 118 is shown engaged with the alternative anchor 120'. The flange 124' acts as a stopper to prevent inserting the anchor 120' beyond a predetermined depth, as tire flange 124' abuts the bottom surface 114A of the bore 114. Upon engagement of the fastener 118 with the anchor 120' the distal open end 144 abuts the flange 124' rather than the bottom surface 114A of the bore 114.

Figure 7E:
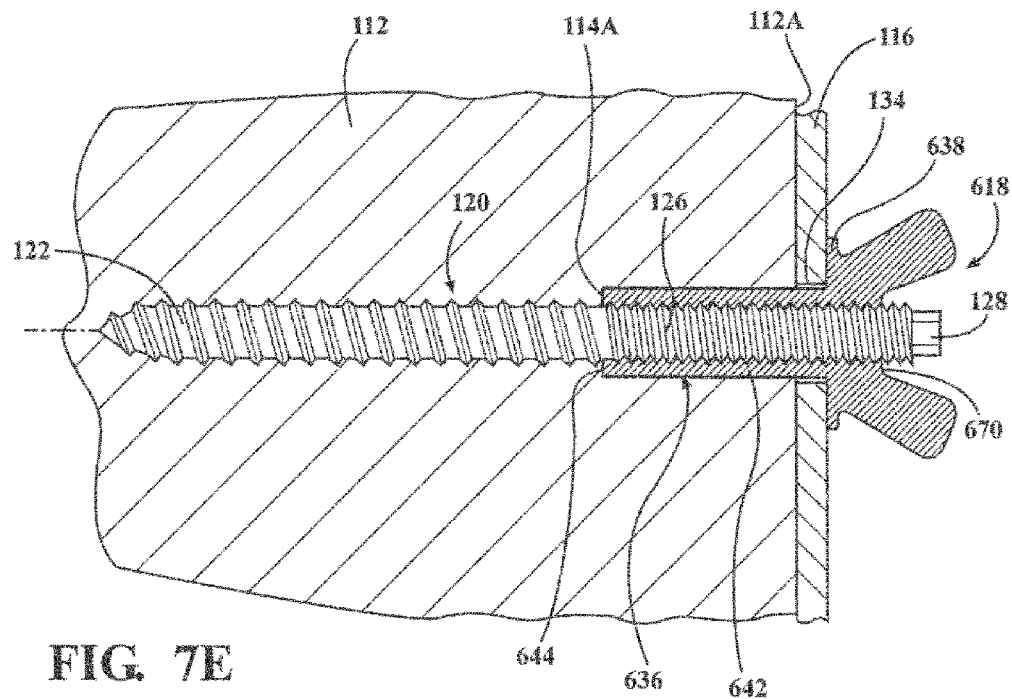
FIG. 7E is a cross-sectional view of the fastener anchoring the shutter panel to the building frame.

With reference to FIG. 7E another alternative configuration of the fastener is illustrated at 618. The fastener 618 includes a cylindrical shank portion 636 and a flange portion 338. The fastener 618 includes a hollow interior portion 644 that extends from the distal open end 644 entirely through the shank portion 636 through the flange portion 638. Centered in the attachment portion 640 is an open end cap 670. In this configuration the anchor 120 is installed such that the driver section 128 and a portion of the attachment section 126 extends beyond the surface 112A of the building frame 112. During installation of the fastener 618 engages with the anchor 120 until the distal open end 644 abuts the bottom surface 114A of the bore 114. As the fastener 618 is hollow the entire length of the fastener 618, the attachment section 126 and the drive section 128 extend from the open end cap 670. As with other configuration, the shear strength of the shutter panel assembly is increased as the shear stress applied by the shutter panel 116 is applied to the shank portion 642 rather than merely only the anchor 120.

Figure 7F:
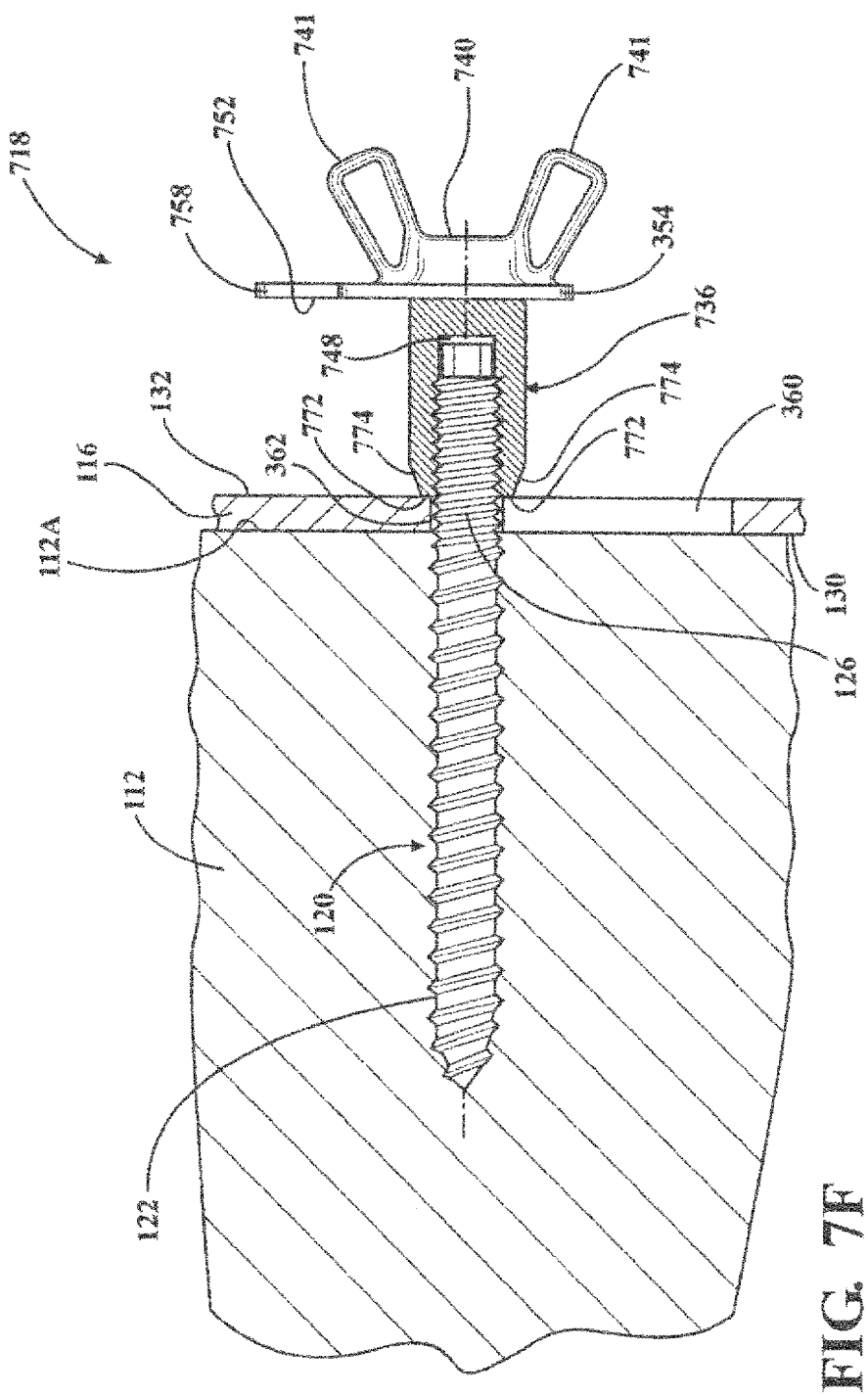
FIG. 7F is a cross-sectional view of an alternative fastener anchoring the shutter panel to the building frame.
Figure 8:
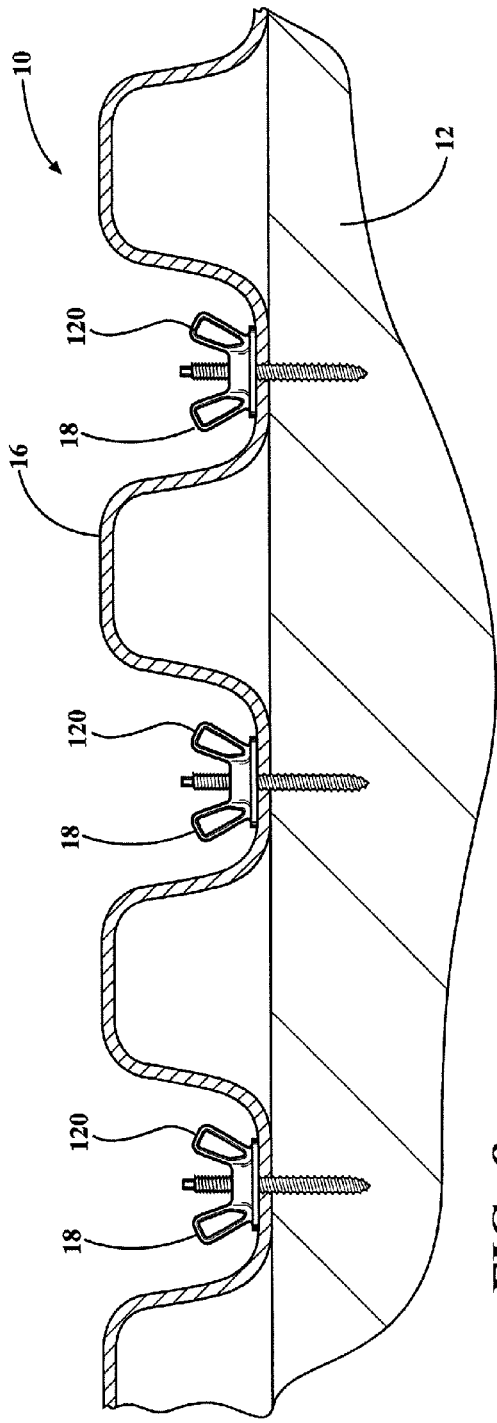
FIG. 8 illustrates a cross-sectional view of the previously known shutter panel assemblies.

With reference to FIG. 7F, an additional alternative configuration of the fastener is illustrated. The fastener 718 includes the shank portion 736, the flange portion 738, and the attachment portion 740. The shank portion 736 includes the hollow portion 742 having a flat distal open end 772 that receives a portion of the attachment section 126 that extends outwardly from the surface 112A of the building frame 112. A tapered portion 774 is positioned between the flat distal open end 772 and the remainder of the shank portion 736.

During installation, the anchor 120 is driven into the building frame such that a portion of the attachment section 126 extends outwardly from the surface 112A of the building frame 112. The fastener 718 is engaged with the attachment section 126, specifically, the internal threads 746, and the flat distal open end 772 is space apart from the surface 112A of the building frame 112 a distance generally equal to the thickness of the shutter panel 116.

The shutter panel 116 is then positioned so that the first portion 360 and the second portion 362 of the aperture 334 are aligned with the flange portion 738 and the tab portion 758, respectively. Once the shutter panel 116 is positioned adjacent the surface 112A, the shutter panel 116 is lowered and the tapered portion 774 guides the shutter panel 116 into the space between the flat distal open end 772 and the surface 112A of the building frame 112. Additional fasteners secure the shutter panel 116 to the building frame 112 and the flange portion 738 and the tab portion 758 act as stoppers to prevent the aperture 334 of the shutter panel 116 from disengaging with the fastener 718 if the shutter panel 116 is displaced out of the space between the flat distal open end 772 and the surface 112A of the building frame.

The compression of the shutter panel 116 between the surface 112A of the building frame 112 and the flat distal open end 772 reduces movement of the shutter panel 116 causing chatter and noise in the wind.

The inventive shutter panel assembly having the inventive fastener 118 is not limited to the direct attachment of the shutter panel 116 to the building frame 112. The inventive fastener 118 is optionally used to secure a shutter rail to the building frame 112. The shutter rail includes an aperture similar to the aperture 134 in the shutter panel 116 to allow the shank portion 136 of the fastener 118 to enter the counterbore 114 provided in the building frame 112. The shutter rail is used to secure various types of shutter panels illustratively including rolldown shutters, accordion style shutters, corrugated panels or flat panels.

Moreover, the inventive anchoring system having the inventive fastener 118 is not limited to use in only securing shutter panel assemblies 100, rather the fastener 118 is operable to reduce the shearing probability of the anchor 120 in securing a first component and a second component. The first component having a bore formed in a surface thereof, and an externally threaded elongated anchor having an exposed portion extending outwardly from a bottom surface of the bore, the second component having an aperture aligned with the bore.

Further, the fastener 118 of the shutter panel assembly 100 inventive is not limited to the use of either flat or corrugated hurricane panels. The fastener 118 is optionally operable to secure any type of covering that covers the opening in the building illustratively including fabric, plywood, particleboard sheets, or other panels formed out of metal or plastic materials.

It is appreciated, of course, that the fastener 118 is not required to include an attachment portion 140 having a pair of wing tips 141. In the alternative, the attachment portion 140 of the fastener is optionally configured to have various screw drives that mate with a corresponding with a driver, such as a flat, Philip, polygonal, irregular shapes, or any other screw drive known to those of ordinary skill in the art. Additionally, the attachment portion is optionally shaped to engage with a socket type screw drive and includes any known shape for such a socket drive as seen in FIGS. 4A and 4B which illustrate the fasteners 218 and 518 in which the attachment portions 240 and 540, respectively, have a regular hexagon head for engagement with a correspondingly shaped driver. The configuration of the attachment portion 140 allows the fastener 118 to engage with the anchor 120 to be secured through the use of tool, hand or powered, to tighten the fastener 118 using a mechanical advantage.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art.

The invention claimed is:

1. A shutter panel assembly that protects a building opening from impact damage, the building opening having a frame with a bore formed therein and an externally threaded elongated anchor having an exposed portion extending outwardly from a bottom surface of the bore, said shutter panel assembly comprising:
    a shutter panel having a first surface, an opposite second surface, and an aperture extending between said first surface and said second surface; and
    a fastener having a shank portion and a flange portion, said shank portion having an internally threaded hollow portion adjacent a distal open end of said shank portion, said flange portion extending radially outwardly from a proximate end of said shank portion, said shank portion includes a solid portion positioned between said hollow portion and said flange portion, said solid portion having a length corresponding to a thickness of said shutter panel;
    wherein said shutter panel is positioned with said first surface abutting the frame and said aperture corresponding with the bore, and said shank portion extends through said aperture of said shutter panel and said hollow portion engages the anchor to compress said shutter panel between the frame and said flange portion of said fastener to support said shutter panel against the frame.

2. The shutter panel assembly of claim 1, wherein the bore has a predetermined depth such that upon engagement of said hollow portion with the external threads of the anchor, said distal open end of said hollow portion abuts the bottom surface of the bore and said flange portion compresses said shutter panel against the frame.

3. The shutter panel assembly of claim 2 wherein said hollow portion has a length corresponding to the predetermined depth of the bore such that upon abutment of said distal open end and the bottom surface of the bore, said solid portion is positioned within said aperture of said shutter panel to increase shear resistance of said fastener.

4. The shutter panel assembly of claim 3, wherein said aperture has a first portion and a second portion in communication with said first portion, said first portion having a shape corresponding to a shape of said flange portion and said second portion having a shape corresponding to a shape of said shank portion, and wherein after said fastener engages with the anchor, said first portion of said aperture is aligned with said flange portion to positioned said shutter panel between the frame and said flange portion, and wherein said shutter panel is positioned such that said solid portion is positioned within said second portion of said aperture.

5. The shutter panel assembly of claim 4, wherein said flange portion includes a tab portion extending outwardly from an edge of said flange portion, said tab portion corresponds in shape with said shape of said second portion of said aperture to provide an increase in a contact area between said flange portion and said second surface of said shutter panel.

6. The shutter panel assembly of claim 4, further comprising a washer having a through-hole and a shape that corresponds to said shape of said first portion of said aperture, said washer having a protrusion corresponding in shape to said shape of said second portion of said aperture, and wherein said washer is positioned between said second surface of said shutter panel and said flange portion to provide an increase in a compressive area between said flange portion and said second surface of said shutter panel.

7. The shutter panel assembly of claim 6, wherein said washer is a crimp-type washer.

8. A shutter panel assembly for protecting a building opening from impact damage, the building opening having a frame with a bore formed in a frame surface, the bore having a bottom surface, said shutter panel assembly comprising:
    an externally threaded elongated anchor secured within the bore of the frame, said anchor having an exposed portion extending outwardly from the bottom surface of the bore, said anchor having an end positioned at least flush with the frame surface;
    a shutter panel having a first surface, an opposite second surface, and an aperture extending between said first surface and said second surface; and
    a fastener having a shank portion and a flange portion, said shank portion having an internally threaded hollow portion adjacent a distal open end of said shank portion, said flange portion extending radially outwardly from a proximate end of said shank portion, said shank portion includes a solid portion positioned between said hollow portion and said flange portion, said solid portion having a length corresponding to a thickness of said shutter panel;
    wherein said shutter panel is positioned with said first surface abutting the frame surface and said aperture corresponding with the bore, and said hollow portion extends through said aperture of said shutter panel and said distal open end engages said anchor to compress said shutter panel between the frame surface and said flange portion of said fastener to support said shutter panel against the frame.

9. The shutter panel assembly of claim 8, wherein the bore has a predetermined depth such that upon engagement of said hollow portion with said external threads of said anchor said distal open end of said hollow portion abuts the bottom surface of the bore and said flange portion compresses said shutter panel against the frame surface.

10. The shutter panel assembly of claim 9, wherein said hollow portion has a length corresponding to the predetermined depth of the bore such that upon abutment of said distal open end and the bottom surface of the bore, said solid portion is positioned within said aperture of said shutter panel to increase shear resistance of said fastener.

11. The shutter panel assembly of claim 10, wherein said aperture has a first portion and a second portion in communication with said first portion, said first portion having a shape corresponding to a shape of said flange portion and said second portion having a shape corresponding to a shape of said shank portion, and wherein after said fastener portion engages with said anchor, said first portion of said aperture is aligned with said flange portion to positioned said shutter panel between the frame and said flange portion, and wherein said shutter panel is positioned such that said solid portion is positioned within said second portion of said aperture.

12. The shutter panel assembly of claim 11, wherein said flange portion includes a tab portion extending outwardly from an edge of said flange portion, said tab portion corresponds in shape with said shape of said second portion of said aperture to provide an increase in a contact area between said flange portion and said second surface of said shutter panel.

13. The shutter panel assembly of claim 10, further comprising a washer having a through-hole and a diameter that corresponds to said diameter of said first portion of said aperture, said washer having a protrusion corresponding in shape to said second portion of said aperture, and wherein said washer is positioned between said second surface of said shutter panel and said flange portion to provide an increase in a compressive area between said flange portion and said second surface of said shutter panel.

14. The shutter panel assembly of claim 13, wherein said washer has a plurality of crimps.

15. A fastener for securing a first component to a second component, the first component having a bore formed in a surface thereof and an externally threaded elongated anchor having an exposed portion extending outwardly from a bottom surface of the bore, the second component having a thickness and an aperture aligned with the bore, said fastener comprising:
 a shank portion having an internally threaded hollow portion having a distal open end, said shank portion includes a solid portion positioned between said hollow portion and said flange portion, said solid portion having a length corresponding to the thickness of the second component; and
 a flange portion extending radially outwardly from a proximate end of said shank portion;
 wherein said second component is positioned with the aperture aligned with the bore and said shank portion extends through said aperture and said hollow portion engages the anchor to compress said second component between said flange portion and the first component.

16. The fastener of claim 15, wherein the bore has a predetermined depth such that upon engagement of said hollow portion with the external threads of the anchor, said distal open end of said hollow portion abuts the bottom surface of the bore and said flange portion compresses said second component against the first component.

17. The fastener of claim 16, wherein said hollow portion has a length corresponding to the predetermined depth of the bore such that upon abutment of said distal open end and the bottom surface of the bore, said solid portion is positioned within the aperture of the second component to increase shear resistance of said fastener.

* * * * *